United States Patent [19]
Deus, III et al.

[11] Patent Number: 6,111,819
[45] Date of Patent: Aug. 29, 2000

[54] REDUCED MECHANICAL COUPLING INTERLINK FOR SPATIALLY EXTENDED HYDROPHONES

[75] Inventors: Antonio L. Deus, III, Saunderstown; Gregory H. Ames, South Kingstown, both of R.I.; Paul D. Curry, Voluntown, Conn.

[73] Assignee: The United States of America as represented by the Secretary of the Navy, Washington, D.C.

[21] Appl. No.: 09/412,197

[22] Filed: Oct. 4, 1999

[51] Int. Cl.[7] .................................................. H04R 1/44
[52] U.S. Cl. ............................................. 367/173; 367/154
[58] Field of Search .................................. 367/149, 153, 367/154, 173

[56] References Cited

U.S. PATENT DOCUMENTS 5,737,278  4/1998  Frederick et al. ...................... 367/149
5,748,565  5/1998  Cherbettchian et al. ............... 367/154

*Primary Examiner*—Ian J. Lobo
*Attorney, Agent, or Firm*—Michael J. McGowan; Kevin A. Oliver; Prithvi C. Lall

[57] ABSTRACT

An interlink for connecting hydrophone elements that allows a single sensing fiber to transition from a first hydrophone element, across the interlink, to a second hydrophone element, while providing a secure connection between hydrophone elements without the disadvantages of mechanical resonances produced by a rigid interlink material. The interlink has a first end connected to a first hydrophone element, and a second end connected to a second hydrophone element. The interlink may be composed entirely of open cell foam, or a more rigid structure that is covered by open cell foam. Sensing fiber transitions from a first hydrophone element, onto the foam interlink, and thence onto a second hydrophone element, with only a change in winding angle. The sensing fiber is not susceptible to a rigid interlink structure and undesirable mechanical resonances.

5 Claims, 2 Drawing Sheets

REDUCED MECHANICAL COUPLING INTERLINK FOR SPATIALLY EXTENDED HYDROPHONES

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED APPLICATIONS

This patent application is co-pending with a related patent application entitled Interlink for Spatially Extended Hydrophones Ser. No. 09/412,196, allowed by one of the co-inventors of this patent application, and a related application entitled Reduced Semi-Rigid Low-Noise Interlink for Spatially Extended Hydrophones Ser. No. 09/412,198, allowed by the same co-inventor.

BACKGROUND OF THE INVENTION (1) Field of the Invention

The present invention relates generally to connecting hydrophone elements in linear arrays, and more particularly to a means for connecting hydrophone elements to pass a sensing material, such as optical fiber, from one hydrophone element to another hydrophone element without adversely affecting the sensing material or measurement sensitivity.

(2) Description of the Prior Art

Hydrophone is a generic term describing a transducer that detects or monitors underwater sound. Hydrophones are typically pressure-actuated sensors and form the basis of sonar systems. Fiber-optic hydrophones employ fiber-optic cabling to sense pressure generated by acoustic wavefronts. Acoustic wavefront pressure produces measurable phase differences in the light waves guided by optical fiber.

A fiber-optic hydrophone typically includes a hollow, air-backed element known as a mandrel, with optical fiber wound on the mandrel surface. The advantages of multiple, smaller, interconnected hydrophone elements when compared to a single larger hydrophone element, are presented in U.S. Pat. No. 5,317,544, and such advantages include increased sensitivity and system robustness during deployment. Although prior art discusses the need to connect multiple mandrel-wound hydrophones in series with a single fiber, the interlink's design and material is often ignored. U.S. Pat. No. 5,317,544 mentions a means for compliantly connecting adjacent hydrophone components, while U.S. Pat. No. 5,475,216 claims a neoprene spacer, and U.S. Pat. No. 5,155,548 describes a spacer preferably formed of neoprene. Neoprene spacers or interlinks induce undesirable phase noise in the sensing fiber.

There is currently not a hydrophone interlink that allows a hydrophone array to pass through large bends across small diameter handling sheaves during array deployment, without placing excessive stress on the interlink and sensing fiber; and, there is not an interlink that additionally couples the sensing fiber to a structure such that the fiber is impervious to the structure's mechanical resonances. What is needed is an interlink that is flexible during deployment, but during post-deployment (i.e., operation), ensures minimal fiber stretching from the interlink structure's mechanical resonances.

SUMMARY OF THE INVENTION

It is a general purpose and object of the present invention to provide a hydrophone interlink that connects two hydrophone elements while allowing a single sensing fiber to transition between the two hydrophone elements. It is a further object that such interlink be flexible during deployment to protect the sensing fiber as the interlink passes through small diameter handling sheaves. It is yet a further object that such interlink, during the post-deployment phase, ensures minimal sensing fiber stretching along the interlink from hydrophone array noise sources and the interlink structure's mechanical resonances, as such noise sources cause phase changes that interfere with hydrophone element signals.

Other objects and advantages of the present invention will become more obvious hereinafter in the specification and drawings.

The objects are accomplished with the present invention through a hydrophone interlink with an open cell foam exterior. The open cell foam structure provides flexibility for large bends around small diameter handling sheaves during hydrophone array deployment. Additionally, the flexible open cell foam structure minimizes strains induced by mechanical resonances characteristic of rigid structures. When a sensing fiber is wound on hydrophone elements, the sensing fiber transitions from a first hydrophone element to the open cell foam interlink, and to a second hydrophone element, with only a change in winding angle. Various types of foams and foam stiffness can be used. Other more rigid materials may also be present beneath the foam exterior for additional support.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts, and wherein.

DESCRIPTION OF THE PREFERRED EMBODIMENT

Figure 1:
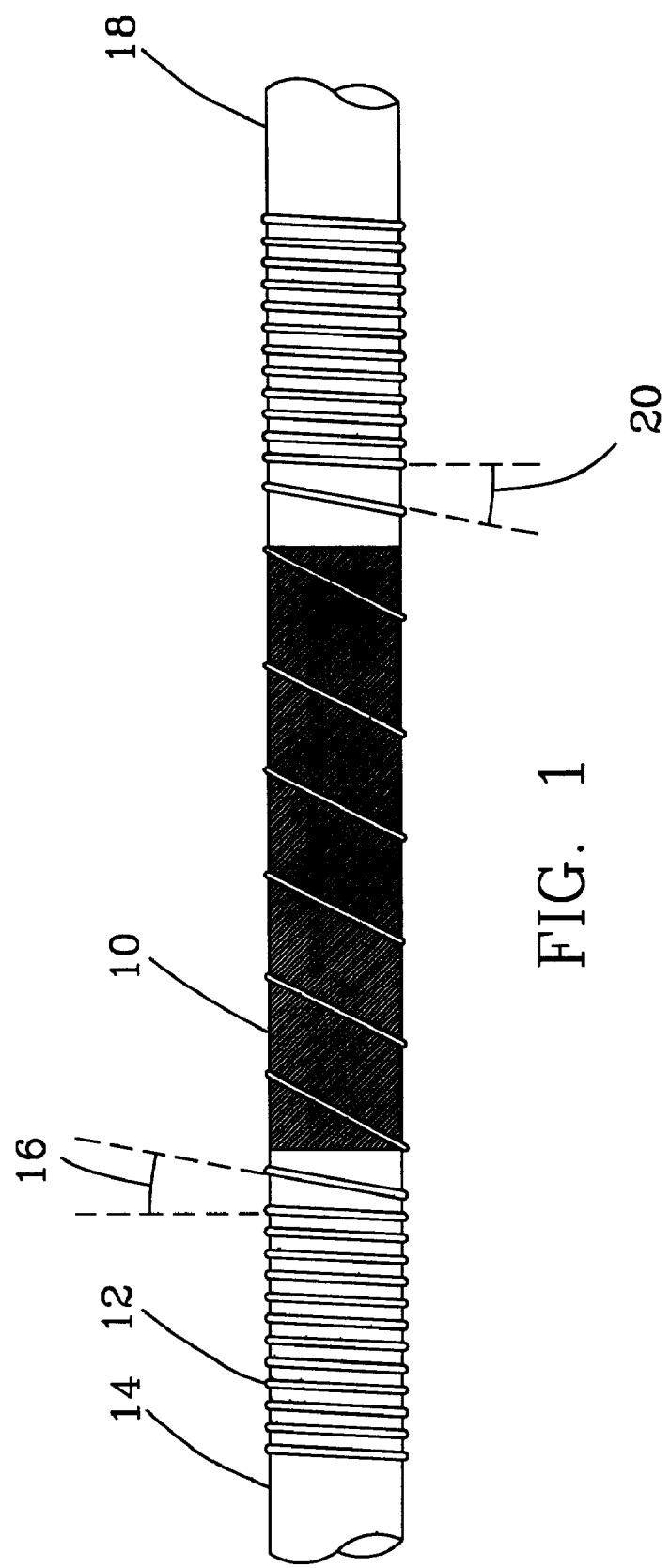
FIG. 1 shows an open cell foam interlink connecting two hydrophone elements.

Referring now to FIG. 1, there is shown an interlink 10 for connecting hydroacoustic sensors. FIG. 1 represents an interlink 10 connecting optical fiber hydrophone elements known as mandrels. The interlink 10 is composed entirely of open cell foam and provides flexibility for bending in handling systems without damaging the interlink or the optical fiber 12.

FIG. 1 shows a first hydrophone element 14 with optical fiber 12 wound directly on the hydrophone element surface. With optical fiber 12 wound from left to right as shown, as the end of the first hydrophone element occurs, the optical fiber winding angle 16 changes to reduce the winding density on the interlink 10. The interlink 10 is the same circumference as the hydrophone element 14 to allow a smooth transition between the hydrophone element and the interlink. The optical fiber 12 continues winding along the open cell foam interlink 10 and onto the second hydrophone element 18, whereupon the winding angle 20 again changes to adapt the optical fiber winding to the desired hydrophone element winding intensity.

Figure 2:
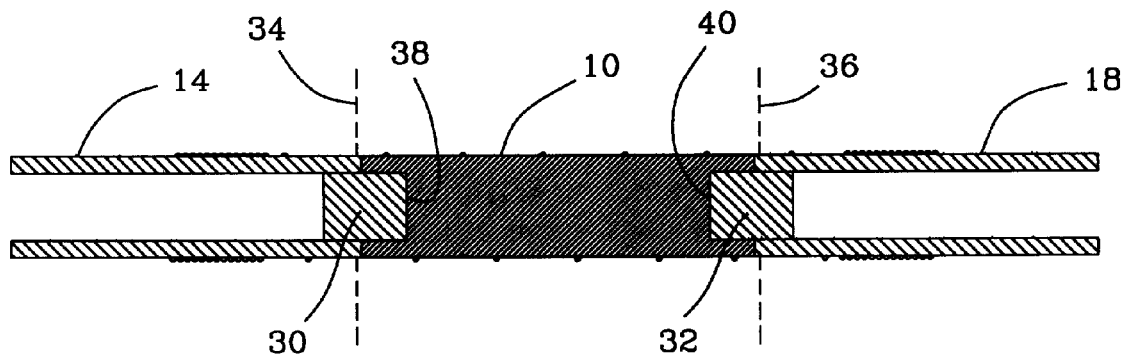
FIG. 2 shows a cross-section of FIG. 1.

Referring now to FIG. 2, there is shown a cross-section of FIG. 1 to detail the connections between the hydrophone elements 14, 18 and the interlink 10. The interlink 10 is the same circumference as the hydrophone elements 14, 18 and is a solid structure comprised of open cell foam. The otherwise hollow hydrophone elements 14, 18 each contain a circular center plug 30, 32 at the hydrophone element ends connected to the interlink, and the center plug 30, 32 extends the otherwise hollow hydrophone element center section beyond the hydrophone element's outer surface length utilized for fiber winding 34, 36. The interlink ends similarly contain a circular indentation 38, 40 matching the dimensions of the hydrophone element plugs 30, 32 to allow the plugs 30, 32 to insert directly to the interlink indentations 38, 40. The matching plug 30, 32 and indentation 38, 40 dimensions allow a seamless transition for the optical fiber winding on the hydrophone element and interlink outer surfaces. A bonding agent such as glue secures the hydrophone element plugs 30, 32 to the interlink indentations 38, 40.

The interlink of FIG. 1 and FIG. 2 is compatible with continuous fiber winding and assembly as the optical fiber is wound directly from a first hydrophone element 14, onto the foam interlink 10, and to the second hydrophone element 28, with only a change in winding angle. The interlink 10 single piece construction additionally simplifies automated assembly and reduces material costs.

Figure 3:
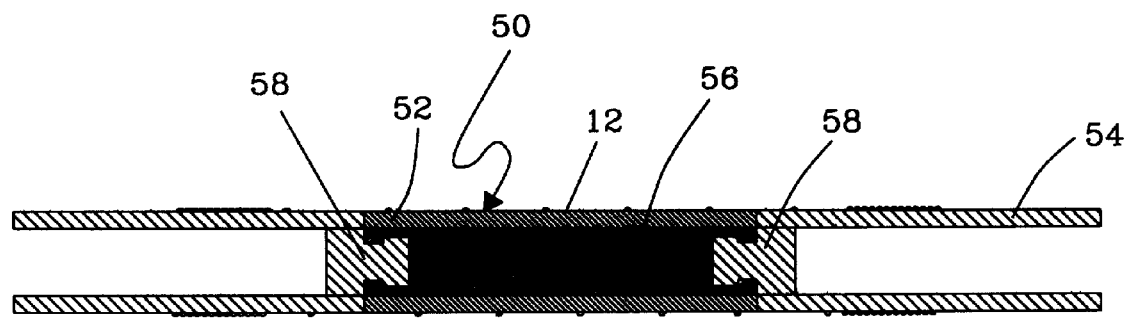
FIG. 3 shows an alternative open cell foam interlink.

Referring now to FIG. 3, there is shown an alternative interlink 50 with many of the same advantages as the interlink of FIG. 1 and FIG. 2. Although the FIG. 3 interlink appears identical to FIG. 1 when viewed from the surface, the FIG. 3 cross-sectional view indicates an alternate interior. Open cell foam appears on the interlink exterior 52, with the open cell foam width matching the hydrophone element outer circumference width 54. Within the interlink open cell foam layer is a more rigid material 56, such as polyurethane. The polyurethane is secured to the hydrophone elements by allowing the polyurethane ends to surround the protrusions on the mandrel plugs 58. By covering the more rigid material 56 with the open cell foam 52, and wrapping optical fiber 12 on the open cell foam 52, the optical fiber 12 is decoupled from the more rigid underlying structure 56; therefore, the advantages of a more rigid interlink are obtained without the disadvantage of induced optical fiber strain due to mechanical resonances in the more rigid structure. Additionally, a more rigid structure facilitates automated winding.

The advantages of the present invention over the prior art are that: The present invention provides an interlink that rigidly connects hydrophone elements, yet provides sufficient flexibility during deployment for large bends across small diameter handling sheaves; however, the sensing fiber is not coupled to a rigid interlink structure, and therefore the sensing fiber is not subjected to the rigid interlink's undesirable mechanical resonances.

What has thus been described is an interlink for connecting hydrophone elements that allows a single sensing fiber to transition from a first hydrophone element, across the interlink, to a second hydrophone element, while providing a secure connection between hydrophone elements without the disadvantages of induced mechanical resonances produced by a rigid interlink material. The interlink has a first end connected to the first hydrophone element, and a second end connected to a second hydrophone element. The interlink may be composed entirely of open cell foam, or a more rigid structure that is covered by open cell foam. Sensing fiber transitions from a first hydrophone element, onto the open cell foam surface, and thence onto a second hydrophone element, with only a change in winding angle. The sensing fiber is not susceptible to a rigid interlink structure and undesirable mechanical resonances.

Obviously many modifications and variations of the present invention may become apparent in light of the above teachings. For example: Interlinks have many designs, and although a solid cylindrical structure was shown, various shapes may be used. The interlink shown has a round cross-section, while different shaped cross-sections may be used. Foams other than open cell foam may be used. The sensing fiber may be guided along the foam with a groove in the foam. The interlink may be connected to the hydrophone elements in a variety of manners. The winding angle may not change in the transitions between interlink and hydrophone element. Although the application shown included fiber-optic hydrophones, the same interlink may be used to connect hydrophone elements other than fiber-optic elements, where flexibility and the other interlink characteristics are desired. Multiple interlinks can connect multiple hydrophones in series.

In light of the above, it is therefore understood that within the scope of appended claims, the invention may be practiced otherwise than as specifically described.

What is claimed is:

1. An interlink for connecting a first hydrophone element and a distinct second hydrophone element, comprising:

a first interlink end for connecting to said first hydrophone element;

a second interlink end for connecting to said second hydrophone element;

affixing means to secure said first and second interlink ends to said first hand second hydrophone elements, respectively;

a layer of open cell foam on outer surfaces of said interlink; and a core of open cell foam contiguous with said layer of open cell foam.

2. The interlink of claim 1 wherein said affixing means comprises epoxy.

3. The interlink of claim 1 wherein said affixing means comprises:

a first hydrophone element end plug containing a protrusion, said first plug inserted in said first hydrophone element;

a second hydrophone element end plug containing a protrusion, said second plug inserted in said second hydrophone element;

said first interlink end accepting said first plug protrusion; and said second interlink end accepting said second plug protrusion.

4. An interlink for connecting first and second hydrophone elements at opposite ends thereof, the interlink comprising:

a cylindrical shell of open cell foam having an outside diameter substantially equal to a diameter of the hydrophone elements, and further having a thickness substantially equal to a thickness of the hydrophone elements;

a core underlying the shell of open cell foam, the core being of a material more rigid than the shell of open cell foam and allowing sufficient bend for hydrophone handling systems, the core engaging the first and second hydrophones at respective ends of the core.

5. The interlink of claim 4 wherein said more rigid material comprises polyurethane.

* * * * *